United States Patent
Fan et al.

(10) Patent No.: US 9,830,381 B2
(45) Date of Patent: Nov. 28, 2017

(54) SCORING CANDIDATES USING STRUCTURAL INFORMATION IN SEMI-STRUCTURED DOCUMENTS FOR QUESTION ANSWERING SYSTEMS

(75) Inventors: James J. Fan, Hawthorne, NY (US); David A. Ferrucci, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/605,274

(22) Filed: Sep. 6, 2012

(65) Prior Publication Data

US 2012/0329032 A1    Dec. 27, 2012

Related U.S. Application Data

(63) Continuation of application No. 13/244,351, filed on Sep. 24, 2011.

(60) Provisional application No. 61/386,017, filed on Sep. 24, 2010.

(51) Int. Cl.
*G06F 7/00* (2006.01)
*G06F 17/30* (2006.01)

(52) U.S. Cl.
CPC .............. *G06F 17/30675* (2013.01)

(58) Field of Classification Search
None
See application file for complete search history.

(56) References Cited

U.S. PATENT DOCUMENTS

| | | |
|---|---|---|
| 3,559,995 A | 2/1971 | Steadman |
| 4,594,686 A | 6/1986 | Yoshida |
| 4,599,691 A | 7/1986 | Sakaki et al. |
| 4,829,423 A | 5/1989 | Tennant et al. |
| 4,921,427 A | 5/1990 | Dunn |
| 5,374,894 A | 12/1994 | Fong |

(Continued)

OTHER PUBLICATIONS

Chu-Carroll et al., "In Question-Ansering, Two Heads are Better than One", HLT-NAACL'03, May-Jun. 2003, pp. 24-31, Edmonton, Canada.

(Continued)

*Primary Examiner* — Thu Nga Nguyen
(74) *Attorney, Agent, or Firm* — Scully, Scott, Murphy & Presser, P.C.

(57) ABSTRACT

A system, program product, and methodology automatically scores candidate answers to questions in a question and answer system. In the candidate answer scoring method, a processor device performs one or more of receiving one or more candidate answers associated with a query string, the candidates obtained from a data source having semi-structured content; identifying one or more documents with semi-structured content from the data source having a candidate answer; and for each identified document: extracting one or more entity structures embedded in the identified document; determining a number of the entity structures in the identified document that appear in the received input query; and, computing a score for a candidate answer in the document as a function of the number Overall system efficiency is improved by giving the correct candidate answers higher scores through leveraging context-dependent structural information such as links to other documents and embedded tags.

16 Claims, 5 Drawing Sheets

(56) References Cited

U.S. PATENT DOCUMENTS

| | | | |
|---|---|---|---|
| 5,414,797 A | 5/1995 | Vassiliadis et al. | |
| 5,513,116 A | 4/1996 | Buckley et al. | |
| 5,546,316 A | 8/1996 | Buckley et al. | |
| 5,550,746 A | 8/1996 | Jacobs | |
| 5,559,714 A | 9/1996 | Banks et al. | |
| 5,634,051 A | 5/1997 | Thomson | |
| 5,794,050 A | 8/1998 | Dahlgren et al. | |
| 6,487,545 B1 | 11/2002 | Wical | |
| 6,629,096 B1* | 9/2003 | Reddy | 707/603 |
| 6,751,617 B1 | 6/2004 | Anfindsen | |
| 6,763,341 B2 | 7/2004 | Okude | |
| 6,829,603 B1 | 12/2004 | Chai et al. | |
| 6,947,885 B2 | 9/2005 | Bangalore et al. | |
| 6,983,252 B2 | 1/2006 | Matheson et al. | |
| 7,092,928 B1 | 8/2006 | Elad et al. | |
| 7,136,909 B2 | 11/2006 | Balasuriya | |
| 7,139,752 B2 | 11/2006 | Broder et al. | |
| 7,181,438 B1 | 2/2007 | Szabo | |
| 7,209,876 B2 | 4/2007 | Miller et al. | |
| 7,216,073 B2 | 5/2007 | Lavi et al. | |
| 7,558,778 B2 | 7/2009 | Carus et al. | |
| 7,590,606 B1 | 9/2009 | Keller et al. | |
| 7,610,282 B1* | 10/2009 | Datar | G06F 17/30528 |
| 7,730,085 B2 | 6/2010 | Hassan et al. | |
| 7,805,303 B2 | 9/2010 | Sugihara et al. | |
| 2001/0032211 A1 | 10/2001 | Kuzumaki | |
| 2003/0033287 A1 | 2/2003 | Shanahan et al. | |
| 2004/0049499 A1 | 3/2004 | Nomoto et al. | |
| 2004/0064305 A1 | 4/2004 | Sakai | |
| 2004/0122660 A1 | 6/2004 | Cheng et al. | |
| 2004/0199501 A1* | 10/2004 | Okumura et al. | 707/3 |
| 2004/0254917 A1 | 12/2004 | Brill et al. | |
| 2005/0033711 A1 | 2/2005 | Horvitz et al. | |
| 2005/0060301 A1 | 3/2005 | Seki et al. | |
| 2005/0080614 A1 | 4/2005 | Bennett | |
| 2005/0086045 A1 | 4/2005 | Murata | |
| 2005/0086222 A1 | 4/2005 | Wang et al. | |
| 2005/0114327 A1 | 5/2005 | Kumamoto et al. | |
| 2005/0143999 A1 | 6/2005 | Ichimura | |
| 2005/0256700 A1 | 11/2005 | Moldovan et al. | |
| 2005/0289168 A1 | 12/2005 | Green et al. | |
| 2006/0053000 A1 | 3/2006 | Moldovan et al. | |
| 2006/0106788 A1 | 5/2006 | Forrest | |
| 2006/0122834 A1 | 6/2006 | Bennett | |
| 2006/0141438 A1 | 6/2006 | Chang et al. | |
| 2006/0173834 A1 | 8/2006 | Brill et al. | |
| 2006/0204945 A1 | 9/2006 | Masuichi et al. | |
| 2006/0206472 A1 | 9/2006 | Masuichi et al. | |
| 2006/0206481 A1 | 9/2006 | Ohkuma et al. | |
| 2006/0235689 A1 | 10/2006 | Sugihara et al. | |
| 2006/0277165 A1 | 12/2006 | Yoshimura et al. | |
| 2006/0282414 A1 | 12/2006 | Sugihara et al. | |
| 2006/0294037 A1 | 12/2006 | Horvitz et al. | |
| 2007/0022099 A1 | 1/2007 | Yoshimura et al. | |
| 2007/0022109 A1 | 1/2007 | Imielinski et al. | |
| 2007/0073683 A1 | 3/2007 | Kobayashi et al. | |
| 2007/0078842 A1 | 4/2007 | Zola et al. | |
| 2007/0094285 A1 | 4/2007 | Agichtein et al. | |
| 2007/0118518 A1 | 5/2007 | Wu et al. | |
| 2007/0136246 A1 | 6/2007 | Stenchikova et al. | |
| 2007/0196804 A1 | 8/2007 | Yoshimura et al. | |
| 2007/0203863 A1 | 8/2007 | Gupta et al. | |
| 2007/0203885 A1 | 8/2007 | Kim et al. | |
| 2007/0276829 A1 | 11/2007 | Wang et al. | |
| 2008/0077570 A1 | 3/2008 | Tang et al. | |
| 2008/0147649 A1 | 6/2008 | Kim et al. | |
| 2008/0263019 A1 | 10/2008 | Harrison et al. | |
| 2009/0070298 A1 | 3/2009 | Thione et al. | |
| 2009/0192966 A1 | 7/2009 | Horvitz et al. | |
| 2009/0259642 A1 | 10/2009 | Cao et al. | |
| 2009/0287678 A1 | 11/2009 | Brown et al. | |
| 2009/0292687 A1* | 11/2009 | Fan et al. | 707/5 |
| 2010/0036828 A1* | 2/2010 | Carmel et al. | 707/5 |
| 2010/0100546 A1 | 4/2010 | Kohler | |
| 2011/0066587 A1 | 3/2011 | Ferrucci et al. | |

OTHER PUBLICATIONS

Ferrucci et al., "Towards the Open Advancement of Question Answering Systems," IBM Technical Report RC24789, Computer Science, Apr. 22, 2009.

Moldovan et al., "COGEX: A Logic Prover for Question Answering," Proceedings of HLT-NAACL 2003, May-Jun. 2003, pp. 87-93, Edmonton, Canada.

Simmons, "Natural Language Question-Answering Systems: 1969," Communications of the ACM, Jan. 1970, pp. 15-30, 13(1).

Voorhees et al., "Overview of the TREC 2005 Question Answering Track," Proceedings of the Fourteenth Text Retrieval Conference, 2005, Gaithersburg, Maryland.

Weinstein et al., "Agents Swarming in Semantic Spaces to Corroborate Hypotheses," AAMAS'04, Jul. 19-23, 2004, New York, New York, USA, Copyright 2004 ACM 1-58113-864-4/04/007.

Prager et al., "A Multi-Strategy, Multi-Question Approach to Question Answering," In New Directions in Question-Answering, Maybury, M. (Ed.), AAAI Press, 2004.

Strzalkowski et al., "Advances in Open-Domain Question-Answering," Springer, 2006 (background information only—copy of the front cover, copyright page and table of contents only).

Balahur, "Going Beyond Traditional QA Systems: Challenges and Keys in Opinions Question Answering," Coling 2010: Poster Volume, pp. 27-35, Beijing, Aug. 2010.

Blitzer, Domain Adaptation of Natural Language Processing Systems, Presented to the Faculties of the University of Pennsylvania in Partial Fulfillment of the Requirements for the Degree of Doctor of Philosophy, 2007.

University of Illinois at Urbana-Champaign, Department of Computer Science, Research, 2010, http://cs.illinois.edu/research?report=UIUCDCS-R-2008-2974.

National Center for Biotechnology Information (NCBI), Entrez the Life Sciences Search Engine, Oct. 28, 2009.

Chang et al., "Creating an Online Dictionary of Abbreviations from Medline," J Am Med Inform Assoc. 2002; 9:612-620. DOI 10.1197/jamia.M1139.

Adar, "SaRAD: a Simple and Robust Abbreviation Dictionary," Bioinformatics, Mar. 2004, pp. 527-533, vol. 20 Issue 4.

Cunningham et al., "The Gate User Guide", http://gate.ac.uk/releases/gate-2.0alpha2-build484/doc/userguide.html, This version of the document is for Gate version 2 alpha 1, of Mar. 2001, pp. 1-13.

"INDRI Language modeling meets inference networks," http://www.lemurproject.org/indri/, last modified May 23, 2011; pp. 1-2.

"Apache UIMA ConceptMapper Annotator Documentation," Written and maintained by the Apache UIMA Development Community, Version 2.3.1, Copyright 2006, 2011 The Apache Software Foundation, pp. 1-7, http://uima.apache.org/sandbox.html#concept.mapper.annotator.

"Question answering," From Wikipedia, the free encyclopedia, http://en.wikipedia.org/wiki/Question_answering, last modified Sep. 8, 2011.

Aditya et al., "Leveraging Community-built Knowledge for Type Coercion in Question Answering," Proceedings of ISWC 2011.

Pasca, "Question-Driven Semantic Filters for Answer Retrieval", International Journal of Pattern Recognition and Artificial Intelligence (IJPRAI), World Scientific Publishing, SI, vol. 17, No. 5, Aug. 1, 2003, pp. 741-756.

Cucerzan et al., "Factoid Question Answering over Unstructured and Structured Web Content", In Proceedings of the 14th Text Retrieval Conference TREC 2005, Dec. 31, 2005.

Molla et al., "AnswerFinder at TREC 2004", Proceedings of the 13th Text Retrieval Conference TREC 2004, Dec. 31, 2004.

Wikipedia, List of poets, Sep. 19, 2011, http://en.wikipedia.org/wiki/List_of_poets.

Delicious, the freshest bookmarks that are flying like hotcakes on Delicious and beyond, Sep. 21, 2011, http://delicious.com/.

Wikipedia, List of poets from the United States, Sep. 19, 2011, http://en.wikipedia.org/wiki/List_of_poets_from_the_United_States.

Liu et al., "Effective Keyword Search in Relational Databases", in Proceedings of the 2008 ACM SIGMOD International Conference (56) References Cited

OTHER PUBLICATIONS on Management of Data [online], Published Jun. 27-29, 2006, [retrieved on Jan. 25, 2012]. Retrieved from the internet <URL: http://admis.fudan.edu.cn/intraGroup/DM2Seminar/2007fall.files/ Effective%20Keyword%20Search%20Databases.pdf> entire document.

Kennedy et al., "Query-Adaptive Fusion for Multimodal Search", Proceedings of the IEEE, vol. 96, No. 4 [online], Published Mar. 14, 2008. [retrieved on Jan. 25, 2012], Retrieved from the internet <URL: http://www.ee.columbia.edu/-lyndon/pubs/pieee2008-queryadaptive.pdf> entire document.

Office Action dated May 30, 2014, received in a related U.S. Patent Application, U.S. Appl. No. 13/244,351.

Office Action dated Dec. 2, 2014, received in a related U.S. Patent Application, U.S. Appl. No. 13/244,351.

* cited by examiner

"Barack" and "Obama" redirect here. For other uses, see Barak (disambiguation) and Obama (disambiguation). — 305
For the Kenyan economist, President Obama's father, see Barack Obama, Sr.. — 308
Barack Hussein Obama II (⊕) /bəˈrɑːk huːˈseɪn oʊˈbɑːmə/; born August 4, 1961) is the 44th and current president of the United States. He — 310
served as United States Senator from Illinois, from January 2005 until he resigned following his victory in the 2008 presidential election.

■ ■ ■ ■ ■

■ ■ ■ ■ ■ 320 [[ List of Presidents of the United States ]] He is the [[List of — 315
born August 4, 1961) is the {[[ List of Presidents of the United States | 44th ]]} and {[[ Presidency of Barack Obama | current ]] [[
President of the United States ]]}. He is the [[List of African-American firsts | first ]] ...served as a [[ United States Senate | United
States Senator ]] from [[ Illinois ]], from January 2005 until he resigned following his victory in the [[ United States presidential
election, 2008 | 2008 presidential election ]]. ■ ■ ■ ■ ■
                                              325

SCORING CANDIDATES USING STRUCTURAL INFORMATION IN SEMI-STRUCTURED DOCUMENTS FOR QUESTION ANSWERING SYSTEMS

CROSS-REFERENCE TO RELATED APPLICATIONS

The present invention relates to and claims the benefit of the filing date of commonly-owned, co-pending U.S. patent application Ser. No. 13/244,351 filed Sep. 24, 2011 which further claims the benefit of the filing date of U.S. Provisional Patent Application No. 61/386,017, filed Sep. 24, 2010, the entire contents and disclosure of which is incorporated by reference as if fully set forth herein.

BACKGROUND

The invention relates generally to information retrieval systems, and more particularly, the invention relates to a novel query/answer system and method for open domains implementing a deferred type evaluation of candidate answers using text with limited structure.

DESCRIPTION OF RELATED ART

An introduction to the current issues and approaches of question answering (QA) can be found in the web-based reference http://en.wikipedia.org/wiki/Question_answering. Generally, QA is a type of information retrieval. Given a collection of documents (such as the World Wide Web or a local collection) the system should be able to retrieve answers to questions posed in natural language. QA is regarded as requiring more complex natural language processing (NLP) techniques than other types of information retrieval such as document retrieval, and it is sometimes regarded as the next step beyond search engines.

QA research attempts to deal with a wide range of question types including: fact, list, definition, How, Why, hypothetical, semantically-constrained, and cross-lingual questions. Search collections vary from small local document collections, to internal organization documents, to compiled newswire reports, to the World Wide Web.

Closed-domain QA deals with questions under a specific domain, for example medicine or automotive maintenance, and can be seen as an easier task because NLP systems can exploit domain-specific knowledge frequently formalized in ontologies. Open-domain QA deals with questions about nearly everything, and can only rely on general ontologies and world knowledge. On the other hand, these systems usually have much more data available from which to extract the answer.

Alternatively, closed-domain QA might refer to a situation where only a limited type of questions are accepted, such as questions asking for descriptive rather than procedural information.

Access to information is currently dominated by two paradigms. First, a database query that answers questions about what is in a collection of structured records. Second, a search that delivers a collection of document links in response to a query against a collection of unstructured data, for example, text or html.

A major unsolved problem in such information query paradigms is the lack of a computer program capable of accurately answering factual questions based on information included in a collection of documents that can be either structured, unstructured, or both. Such factual questions can be either broad, such as "what are the risks of vitamin K deficiency?", or narrow, such as "when and where was Hillary Clinton's father born?"

It is a challenge to understand the query, to find appropriate documents that might contain the answer, and to extract the correct answer to be delivered to the user. There is a need to further advance the methodologies for answering open-domain questions.

SUMMARY

The present disclosure addresses the needs described above by providing a candidate answer scoring system, program product, and methodology for use in an automated question answering system that leverages structural information in semi-structured resources.

In one embodiment, the structural information in semi-structured resources include entity structures such as anchor links (texts) in documents.

In the candidate answer scoring method, candidate answers are scored in a context-dependent fashion without a requirement of a full understanding of the semantics of the question, and does not rely on the high accuracy of answer type detection and named entity recognition.

This approach is applicable to questions with both definitive semantic answer types as well as untyped questions, and improves overall system efficiency by giving the correct candidate answers higher scores through leveraging context-dependent structural information.

There is also provided a dynamic infrastructure and methodology for conducting questions and answers with deferred type evaluation using semi-structured text documents that performs scoring candidate answers based on the structural information from the semi-structured document.

In one aspect, there is provided a computer-implemented system, method and computer program product for automatically scoring candidate answers to questions in a question and answer system. The method comprises: receiving an input query string; performing a query analysis upon the input query string to obtain query terms; obtaining a candidate answer from at least one document in a data corpus using the query terms; identifying semi-structured content in the at least one document; extracting one or more entity structures embedded in the at least one document; determining a number of the entity structures in the document that appear in the received input text query; and, computing a confidence score for the candidate answer as a function of the number, wherein at least one of the steps of the method is performed by a processor device.

In this aspect, the structured entities in the document include links to other documents or user embedded tags.

Further to this aspect, the method comprises: accessing a table having entries, each entry including an identified document's corresponding identifier information, and a corresponding value of entity identifiers from the semi-structured content of that identified document, wherein the determining a number of the entity structures comprises: traversing the table to identify the number of associated entity structures associated with a document.

Further to this aspect, the determining a number of the entity structures in the document that appear comprises: determining a similarity between an entity structure and the query terms; and estimating a relevance of the candidate answer to the question based on the determined similarity.

In a further aspect, there is provided a system for automatically scoring candidate answers to questions in a question and answer system. The system includes: a memory storage device; a processor device in communication with the memory device that performs a method. The method comprises: receiving one or more candidate answers associated with a query string, the candidates obtained from a data source having semi-structured content; identifying one or more documents with semi-structured content from the data source having a candidate answer; and for each identified document: extracting one or more entity structures embedded in the identified document; determining a number of the entity structures in the identified document that appear in the received input query; and, computing a score for a candidate answer in the document as a function of the number.

A computer program product is provided for performing operations. The computer program product includes a storage medium readable by a processing circuit and storing instructions run by the processing circuit for running a method(s). The method(s) are the same as listed above.

BRIEF DESCRIPTION OF THE DRAWINGS

The objects, features and advantages of the invention are understood within the context of the Detailed Description, as set forth below. The Detailed Description is understood within the context of the accompanying drawings, which form a material part of this disclosure, wherein:

FIG. 3 depicts an example passage from a source document with semi-structured content showing searchable embedded anchor text links;

DETAILED DESCRIPTION

Figure 1:
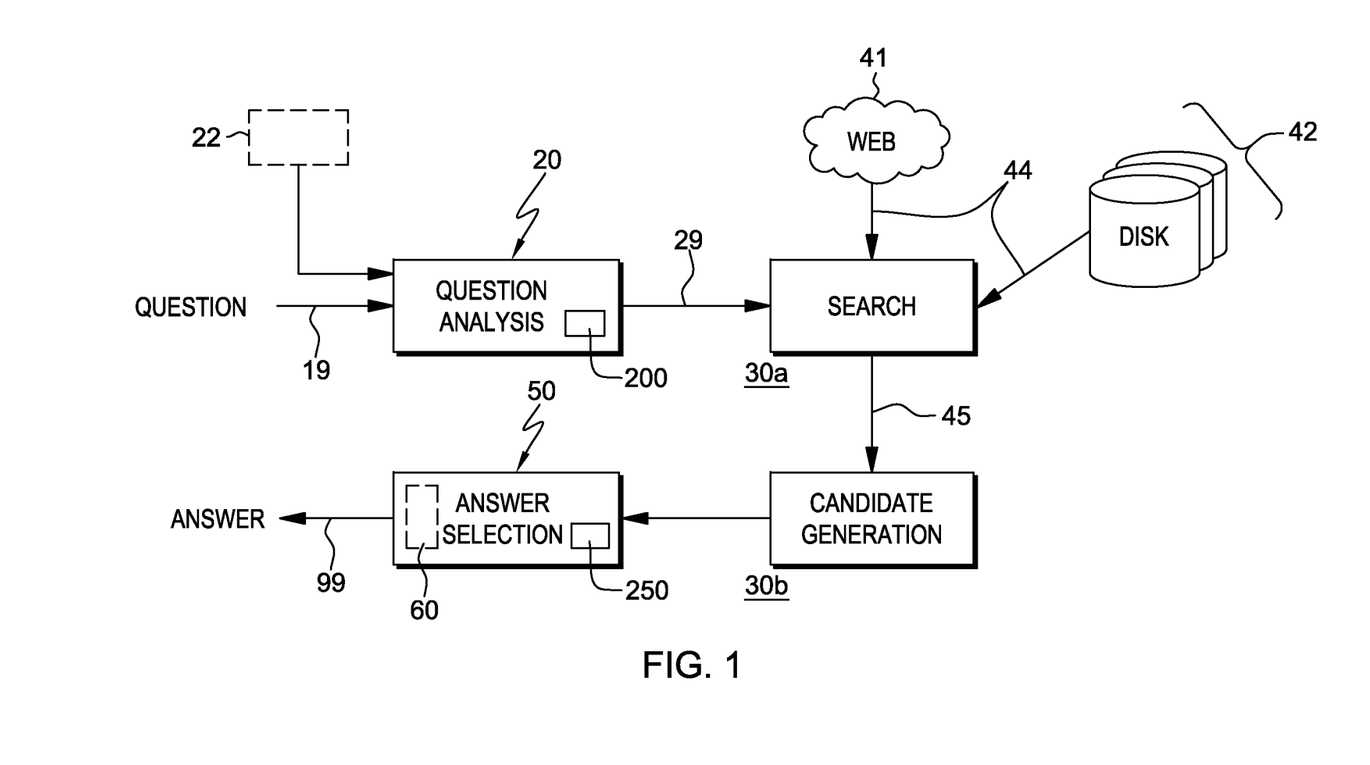
FIG. 1 shows a system diagram depicting a high level logical architecture 10 and question/answering method.

FIG. 1 shows a QA system diagram such as described in U.S. patent application Ser. No. 12/126,642 depicting a high-level logical architecture 10 and methodology in which the present system and method may be employed in one embodiment.

FIG. 1 illustrates the components that comprise a canonical question answering system 10 and their workflow. The question analysis component 20 receives a natural language question 19 (e.g., "Who is the $42^{nd}$ president of the United States?") and analyzes the question to produce, minimally, the semantic type of the expected answer (in this example, "president"), and optionally other analysis results for downstream processing. The search component 30a formulates queries from the output 29 of question analysis and consults various resources such as the World Wide Web 41 or one or more knowledge resources, e.g., databases, knowledge bases 42, to retrieve documents, passages, web-pages, database tuples, etc., that are relevant to answering the question. The candidate answer generation component 30b then extracts from the search results 45 potential (candidate) answers to the question, which are then scored and ranked by the answer selection component 60 to produce a final ranked list of answers with associated confidence scores.

Answer selection is a key component within the question answering system 10 in which each of the candidate answers is given a relevance score and the one with the highest score is returned as the answer to the question. Because the candidate answers generated from candidate generation component 30b may contain numerous wrong answers, it is up to the answer selection component to score the candidates with respect to the question. If candidate scores do not correlate to the correctness of the candidates, then the correct answer is unlikely to be chosen, hence the question answering system is unlikely to be effective.

In question answering systems the candidate scoring is based on either type matching or passage matching or a combination of both.

Type matching candidate scoring returns a score based on how well the candidate's type matches with the answer type. For example, given the question, "In what city was the 1984 Summer Olympics held?" an answer type is city, and a type based candidate scorer should give the candidate Los Angles a higher score than it does for the candidate USA. This approach has the advantage of usually giving the relevant candidates higher scores. However, it suffers from three significant deficiencies.

1) It relies on the question analysis component 20 to correctly identify the semantic type of the answer and the named entity recognizer to correctly identify the true answer being of the answer type. Failure at either stage produces an error from which the system cannot recover.

2) The approach is not amenable to questions without answer types, such as "What was the Parthenon converted into in 1460?" For such questions, oftentimes all noun phrases candidates are given equal high scores, leading to low probability of the correct answer being chosen.

3) This kind of scorer does not discriminate candidates of the same type. For the 1984 Summer Olympics example, it will give an equally high score for candidate Paris, which is not the correct answer, as it will for the correct answer Los Angeles.

Passage based candidate scoring returns a score based on how well the passage from which the candidate is extracted matches with the question. For example, given the question, In what city was the 1984 Summer Olympics held?, a passage based candidate scorer should give the candidate Los Angles a high score if the candidate is extracted from a passage such as In 1984, the city of Los Angles hosted the Olympics. Passage based candidate scorers typically compute their scores based on the common terms between the passage and the question, and/or analyzing the similarities among the term relations in the passage and that in the question. Unfortunately, state of the art passage based candidate scorers are often error prone because none of them can fully comprehend the semantics of the passage or the question.

As referred to herein, a candidate answer is alternately referred to herein as the "candidate" or "candidates".

Overall system performance is improved by giving correct candidates higher scores through leveraging context-dependent structural information. Context may be derived from a supporting passage or document in which the answer is contained. Context may include semi-structured content including: an entity structure such as a web page tag(s) or anchor link text(s) in a document. Other structured entities found in semi-structured documents may include, but are not limited to: meta-information, user placed category annotations in Wikipedia® pages (a registered service mark of Wikimedia Foundation, Inc.), user-annotated meta-information (e.g., users put meta-tags in HTML pages), or other user annotated tags (i.e., clickable hyperlinks such as domain names or a title of a linked destination that includes additional information such as found in a web page such as a Wikipedia® page). For example, either manually or via automated functions, semi-structured content is assumed placed on or embedded within documents, e.g., Web pages.

In one aspect, during a candidate scoring function as implemented by the QA system, the context (e.g., content in a link or tag) associated with the candidate answer is compared to the question rather than looking at the candidate answer without any context.

The document resources may include embedded semi-structured content without any specific context specified. Thus, in one aspect, the method implies context, and implied context is utilized in the present disclosure for purposes of scoring the candidates to see how relevant a candidate answer is with respect to the question. The score may be used as a dimension of evidence used to determine a confidence score for the candidate answer.

Scoring Candidates Using Document Entity Structures (e.g., Links or Tags)

Some documents have links that associate one document to closely related ones. For example, the Wikipedia® page, document or article for Los Angles has links to other Wikipedia® articles, such as California, United States, 1984, Olympics, etc. The links highlight the important aspects of a document from which the candidate is extracted, and provide the context in which the candidate occurs. By measuring the similarity of document links with the question text, contextual dependent scores can be given to candidates.

Figure 2:
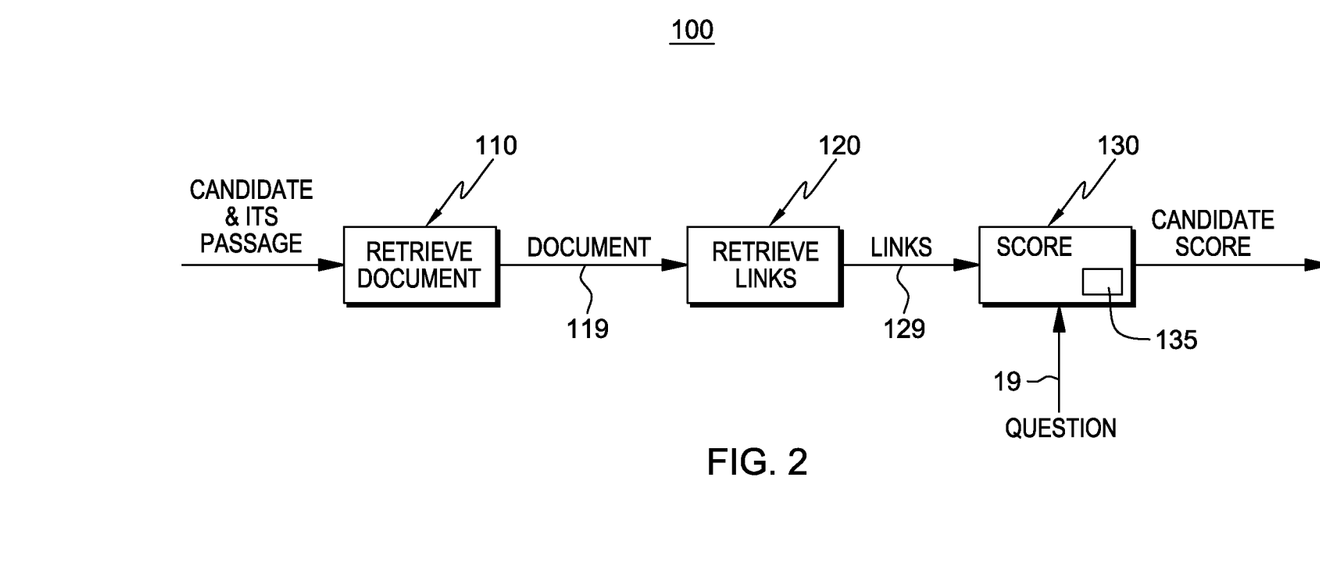
FIG. 2 is a flow diagram of a method for conducting questions and answers with deferred type evaluation.

FIG. 2 shows the candidate answer scoring process 100 employing a function for determining similarity between the semi-structured document content, for example document links, and the question text. First, at 110 a search engine, such as implemented by Google, Yahoo!, Bing, etc., or the Indri engine from the Lemur Toolkit (http://www.lemurproject.org/indri/) searches against a closed or open domain corpus, e.g., a local database or the Internet, given a candidate answer and supporting passage. Such processing returns the document 119 that contains the candidate answer and supporting passage. In view of FIG. 1, it is possible that an upstream candidate generation component delivers a list of candidate answers and the supporting passages from which they occur together with their provenance information (e.g. document id, URI, URL, etc.). Then, at 120, from the document retrieved in step 110, the method extracts a link or list of links or tag(s) 129 contained in the document. This may be performed by a parser or device that receives the source document, and recognizes semi-structured information in the source document (e.g., in a mark-up language).

As shown in FIG. 3, for example, Wikipedia® source documents have embedded anchor links in Wiki mark-up. In FIG. 3 an example Wikipedia® source document 300 includes a segment 305 having semi-structured content for a topic "Obama" that includes anchor text hyperlinks such as "$44^{th}$" 308 and "current President of the United States" 310. The corresponding Wiki source code segment 315 (e.g., Wiki mark-up) includes the designation of the searchable anchor texts for "44th" as code portion 320 and the searchable anchor text for "current president of the united states" as code portion 325. The text string between the "[[" and "]]" indicates the anchor text.

Returning to FIG. 2, at 130, the method takes in the link(s) or tag(s) and the given question 19 and returns the score or number of links or tags that appear in the question. For example, all anchored links in an article are extracted and these linked destinations are compared against and matched with the question. Further, functionality is provided to ascertain the similarity or relevance of the anchor link text and, in one embodiment, a comparison function 135 is invoked that evaluates the similarity between the substructures/entities and the question to estimate the relevance of the candidate to the question. For example, given an input question:

"This person won the presidential election in the United States in 2008?"

A candidate answer is generated from a document Wikipedia® article on Barak Obama, and the Wiki Barak Obama page includes hyperlinks that exist on that page, each hyperlink is reviewed to determine which hyperlink match with some part of the clue, e.g., a hyperlink may be "election" in the Wiki page. Thus, the election points to a Wikipedia® page whose title is "election" or "presidential election". A function records that this title matches some portion of the clue and a score is incremented as containing a match and maintained. The function records or tallies the frequency of matching, i.e., how many of the links or tags in the document match a term in the input query. The greater the amount of matches, the greater the association or connection between the document (e.g., Wikipedia® article) and the query.

In one embodiment, the frequency (amount of matches of links/tags to question terms) in that document, page or article, is used as the answer score.

In one embodiment, a ranking process may be employed to rank documents and their associated scores. The article with the highest frequency is most likely containing the candidate answer.

It is understood that the method is applicable to questions with both definitive semantic answer types as well as untyped questions. For example, definitive answer type questions includes questions such as: "This person won the presidential election in the United States in 2008?" it is clear from the question that the question answer type is a person. However, a question that reads as "Phosphorus emits this when energy level is discharged" is an untyped question because it is not clear what the question answer type is.

In a further embodiment, the links themselves may be further followed by the search engine to obtain further documents or passages therefrom. For the example provided, the link "election" in the presidential election example may be followed, and additional passages evaluated for link/tag matches (i.e., further matches) which can be tallied to add to the score. For example, the scores from the additional passages can be computed in similar fashion with a discounted weight. In another example, instead of a sum of the raw counts, it may be the sum of the raw counts divided by two (2).

In one embodiment, a list of the entity structures may be compiled ahead of time for a set of documents. In other words, a list of links or tags may be compiled ahead of time for easy look-up for a particular domain, topic or subject, in an off-line process. A database of web-sites, web pages or documents and associated IDs may be pre-formed for a particular domain or topic. In this embodiment, a list of links or tags is extracted from a document corpus and maintained in a look-up table. In one embodiment, a table includes a hash table having entries of pages indicated by their corresponding document identifiers (ID) and its associated list of links (frequency) that could be found therein. Thus, when scoring is performed, the hash table is traversed and for any passages having candidate answers in a document that is matched to a document ID entry in the hash table, the frequency of an associated list of links that appear in the document (as the semi-structured information in the document) is readily obtained.

In one example, the standard hash table from Java programming language, e.g. Java SE 7 (Jul. 28, 2011), for execution on a Java Runtime Environment, with the key of the table being the document ID and the value of the table being a list of entity identifiers from the semi-structured content of that document, e.g., in the hash table look-up form as follows:

HashMap<String, List<String>>table

In a further aspect, when employed in a QA system, the final candidate answer score as computed herein may be further processed during QA system processing that assigns an associated weight with the match count by implementing a machine learning algorithm. In parallel processes, the QA system may further determine other candidate answer scores with other weights associated, and, the weighted match count is combined with the other weighted scores for the candidate answer in determining a final answer score.

Thus, a method for candidate scoring is provided in which the scoring step comprises: accessing a semi-structured source of information based on the provenance information. Then, there is performed the retrieving substructures/entities such as the anchor text/entities within the document. Optionally, anchor text/entities in these documents may be followed and additional processing performed.

It is noted that the searching of anchor text/entities implements processing based on an appropriate query. That is, the search engine and retrieval functions know which substructure to look for in the document, for example anchor text phrases that are relevant. For example, a user indicates in a query what type of structure is useful and a query may only match against anchor text for scoring in one task/domain, while in a different domain/task, the user may only query against certain types of structure such as an html link or meta tags.

Then, the method applies the comparison function to judge the similarity between the substructures/entities and the question to estimate the relevance of the candidate to the question (e.g. the number of anchor texts that appear in the question). Then there is returned the resulting comparison score as candidate scores. For example, the comparison function evaluate if the link is part of the query. In the example provided herein, a link may include the word "elect", rather than the word "election"; however, this link may be judged by the comparison function as the same.

In one embodiment, an example of such comparison function that may be implemented is a "string equal function", for example, the String.equals( ) function in Java programming language. Other comparison functions may also be used, such as edit distance or synonym matching, such as described in a reference to Gusfield, Dan (1997), Algorithms on strings, trees, and sequences: computer science and computational biology. Cambridge, UK: Cambridge University Press, incorporated herein by reference.

As mentioned, FIG. 1 shows a QA system diagram such as described in U.S. patent application Ser. No. 12/126,642 depicting a high-level logical architecture 10 and methodology in which the present system and method may be employed in one embodiment.

Generally, as shown in FIG. 1, the high level logical architecture 10 includes the Query Analysis module 20 implementing functions for receiving and analyzing a user query or question. The term "user" may refer to a person or persons interacting with the system, or refers to a computer system 22 generating a query by mechanical means, and where the term "user query" refers to such a mechanically generated query and context 19'. A candidate answer generation module 30 is provided to implement a search for candidate answers by traversing structured, semi structured and unstructured sources contained in a Primary Sources module 11 and in an Answer Source Knowledge Base (KB) module 21 containing collections of relations and/or lists extracted from primary sources. All the sources of information can be locally stored or distributed over a network, including the Internet.

The Candidate Answer generation module 30 of architecture 10 generates a plurality of output data structures containing candidate answers based upon the analysis of retrieved data. In FIG. 1, an Evidence Gathering module 50 interfaces with the primary sources 11 and knowledge base 21 for concurrently analyzing the evidence based on passages having candidate answers, and scores each of candidate answers, in one embodiment, as parallel processing operations. In one embodiment, the architecture may be employed utilizing the Common Analysis System (CAS) candidate answer structures as is described in commonly-owned, issued U.S. Pat. No. 7,139,752, the whole contents and disclosure of which is incorporated by reference as if fully set forth herein.

As depicted in FIG. 1, the Evidence Gathering module 50 comprises a Candidate Answer Scoring module 40 for analyzing a retrieved passage and scoring each of candidate answers of a retrieved passage. The Answer Source Knowledge Base (KB) 21 may comprise one or more databases of structured or semi-structured sources (pre-computed or otherwise) comprising collections of relations (e.g., Typed Lists). In an example implementation, the Answer Source knowledge base may comprise a database stored in a memory storage system, e.g., a hard drive.

An Answer Ranking module 60 may be invoked to provide functionality for ranking candidate answers and determining a response 99 returned to a user via a user's computer display interface (not shown) or a computer system 22, where the response may be an answer, or an elaboration of a prior answer or request for clarification in response to a question—when a high quality answer to the question is not found. A machine learning implementation is further provided where the "answer ranking" module 60 includes a trained model component (not shown) produced using a machine learning techniques from prior data.

The processing depicted in FIG. 1, may be local, on a server, or server cluster, within an enterprise, or alternately, may be distributed with or integral with or otherwise operate in conjunction with a public or privately available search engine in order to enhance the question answer functionality in the manner as described. Thus, the method may be provided as a computer program product comprising instructions executable by a processing device, or as a service deploying the computer program product. The architecture employs a search engine (e.g., a document retrieval system) as a part of Candidate Answer Generation module 30 which may be dedicated to searching the Internet, a publicly available database, a web-site (e.g., IMDB.com) or, a privately available database. Databases can be stored in any storage system, non-volatile memory storage systems, e.g., a hard drive or flash memory, and can be distributed over the network or not.

As mentioned, the system and method of FIG. 1 makes use of the Common Analysis System (CAS), a subsystem of the Unstructured Information Management Architecture (UIMA) that handles data exchanges between the various UIMA components, such as analysis engines and unstructured information management applications. CAS supports data modeling via a type system independent of programming language, provides data access through a powerful indexing mechanism, and provides support for creating annotations on text data, such as described in (http://www.research.ibm.com/journal/sj/433/gotz.html) incorporated by reference as if set forth herein. It should be noted that the CAS allows for multiple definitions of the linkage between a document and its annotations, as is useful for the analysis of images, video, or other non-textual modalities (as taught in the herein incorporated reference U.S. Pat. No. 7,139, 752).

In one embodiment, the UIMA may be provided as middleware for the effective management and interchange of unstructured information over a wide array of information sources. The architecture generally includes a search engine, data storage, analysis engines containing pipelined document annotators and various adapters. The UIMA system, method and computer program may be used to generate answers to input queries. The method includes inputting a document and operating at least one text analysis engine that comprises a plurality of coupled annotators for tokenizing document data and for identifying and annotating a particular type of semantic content. Thus it can be used to analyze a question and to extract entities as possible answers to a question from a collection of documents.

As further shown in greater detail in the architecture diagram of FIG. 1, the "Query Analysis" module 20 receives an input that comprises the query 19 entered, for example, by a user via their web-based browser device. An input query 19 may comprise a text string. The query analysis block 20 includes additionally a Lexical Answer Type (LAT) block 200 that implements functions and programming interfaces to provide additional constraints on the answer type (LAT). The computation in the block 20 comprises but is not limited to the Lexical Answer Type. The LAT block 200 includes certain functions/sub-functions (not shown) to determine the LAT.

As mentioned above, a LAT of the question/query is the type (i.e. the descriptor) of the referent of the entity that is a valid answer to the question. In practice, LAT is the descriptor of the answer detected by a natural language understanding module comprising a collection of patterns and/or a parser with a semantic interpreter.

With reference to the Lexical Answer Type (LAT) block 200, in the query analysis module 20 of FIG. 1, the LAT represents the question terms that identify the semantic type of the correct answer. In one embodiment, as known, a LAT may be detected in a question through pattern LAT detection rules. These rules are implemented and can be encoded manually or learned by machine automatically through association rule learning. In this case, the natural language understanding model can be limited to implementation the rules.

In one embodiment, the above-described modules of FIG. 1-2 can be represented as functional components in UIMA is preferably embodied as a combination of hardware and software for developing applications that integrate search and analytics over a combination of structured and unstructured information. The software program that employs UIMA components to implement end-user capability is generally referred to as the application, the application program, or the software application.

The UIMA high-level architecture, one embodiment of which is illustrated in FIG. 1, defines the roles, interfaces and communications of large-grained components that cooperate to implement UIM applications. These include components capable of analyzing unstructured source artifacts, such as documents containing textual data and/or image data, integrating and accessing structured sources and storing, indexing and searching for artifacts based on discovered semantic content.

Although not shown, a non-limiting embodiment of the UIMA high-level architecture includes a Semantic Search Engine, a Document Store, at least one Text Analysis Engine (TAE), at least one Structured Knowledge Source Adapter, a Collection Processing Manager, at least one Collection Analysis Engine, all interfacing with Application logic. In one example embodiment, the UIMA operates to access both structured information and unstructured information to generate candidate answers and an answer in the manner as discussed herein. The unstructured information may be considered to be a collection of documents, and can be in the form of text, graphics, static and dynamic images, audio and various combinations thereof.

Figure 4:
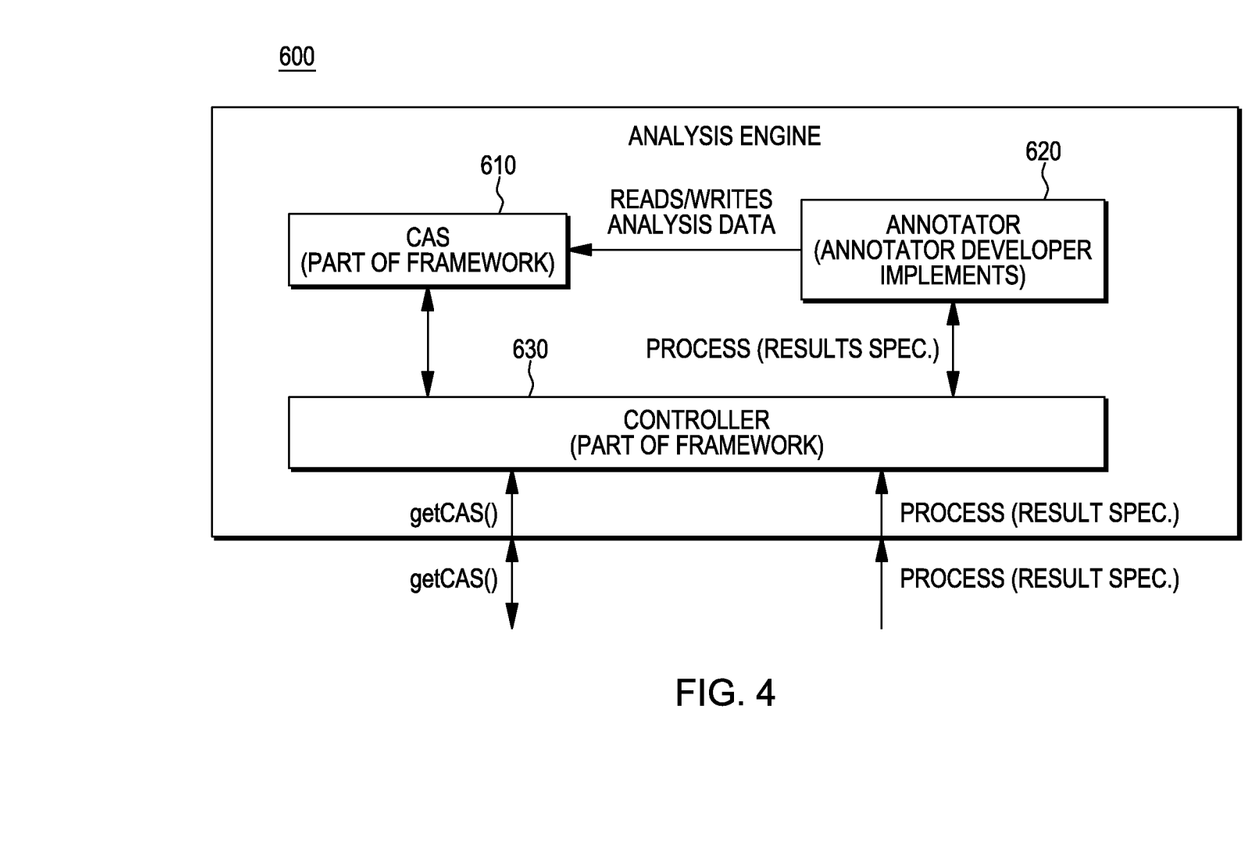
FIG. 4 depicts an aspect of a UIMA framework implementation for providing one type of analysis engine for processing CAS data structures.

Aspects of the UIMA are further shown in FIG. 4, where there is illustrated an Analysis Engine (AE) 600 that can be a component part of the Text Analysis Engine (TAE). Included in the AE 600 is a Common Analysis System (CAS) 610, an annotator 620 and a controller 630. A second embodiment of a TAE (not shown) includes an aggregate Analysis Engine composed of two or more component analysis engines as well as the CAS, and implements the same external interface as the AE 600.

Common Analysis System 610

The Common Analysis System (CAS) 610 is provided as the common facility that all Annotators 620 use for accessing and modifying analysis structures. Thus, the CAS 610 enables coordination between annotators 620 and facilitates annotator 620 reuse within different applications and different types of architectures (e.g. loosely vs. tightly coupled). The CAS 610 can be considered to constrain operation of the various annotators.

The CAS 610 principally provides for data modeling, data creation and data retrieval functions. Data modeling preferably defines a tree hierarchy of (data) types, as shown in the example Table 1 provided below. The types have attributes or properties referred to as features. In preferred embodiments, there are a small number of built-in (predefined) types, such as integer (int), floating point (float) and string; UIMA also includes the predefined data type "Annotation". The data model is defined in the annotator descriptor, and shared with other annotators. In the Table 1, some "Types" that are considered extended from prior art unstructured information management applications to accommodate question answering in the preferred embodiment of the invention include:

TABLE 1

| TYPE (or feature) | TYPE's PARENT (or feature type) |
| --- | --- |
| Query Record | Top |
| Query | Query Record |
| Query Context | Query Record |
| Candidate Answer Record | Annotation |
| Candidate Answer | Candidate Answer Record |
| Feature: CandidateAnswerScore | Float |
| QueryLexical Answer Type | Annotation |
| CandidateAnswer LT | Annotation |
| Feature: TyCorScore | Float |

In Table 1, for example, all of the question answering types (list in the left column) are new types and extend either another new type or an existing type (shown in the right column). For example, both Query and Query Context are kinds of Query Record, a new type; while Candidate Answer Record extends the UIMA type Annotation, but adds a new feature CandidateAnswerScore which is a Float. In addition, Table 1 describes the query LAT as having a UIMA Annotation type; CandidateAnswerLT is also an Annotation, but with an additional featue TyCorScore of type Float.

CAS 610 data structures may be referred to as "feature structures." To create a feature structure, the type must be specified (see TABLE 1). Annotations (and-feature structures) are stored in indexes.

The CAS 610 may be considered to be a collection of methods (implemented as a class, for example, in Java or C++) that implements an expressive object-based data structure as an abstract data type. Preferably, the CAS 610 design is largely based on a TAE Feature-Property Structure, that provides user-defined objects, properties and values for flexibility, a static type hierarchy for efficiency, and methods to access the stored data through the use of one or more iterators.

The abstract data model implemented through the CAS 610 provides the UIMA 100 with, among other features: platform independence (i.e., the type system is defined declaratively, independently of a programming language); performance advantages (e.g., when coupling annotators 610 written in different programming languages through a common data model); flow composition by input/output specifications for annotators 610 (that includes declarative specifications that allow type checking and error detection, as well as support for annotators (TAE) as services models); and support for third generation searching procedures through semantic indexing, search and retrieval (i.e. semantic types are declarative, not key-word based).

The CAS 610 provides the annotator 620 with a facility for efficiently building and searching an analysis structure. The analysis structure is a data structure that is mainly composed of meta-data descriptive of sub-sequences of the text of the original document. An exemplary type of meta-data in an analysis structure is the annotation. An annotation is an object, with its own properties, that is used to annotate a sequence of text. There are an arbitrary number of types of annotations. For example, annotations may label sequences of text in terms of their role in the document's structure (e.g., word, sentence, paragraph etc), or to describe them in terms of their grammatical role (e.g., noun, noun phrase, verb, adjective etc.). There is essentially no limit on the number of, or application of, annotations. Other examples include annotating segments of text to identify them as proper names, locations, military targets, times, events, equipment, conditions, temporal conditions, relations, biological relations, family relations or other items of significance or interest.

Typically an Annotator's 620 function is to analyze text, as well as an existing analysis structure, to discover new instances of the set of annotations that it is designed to recognize, and then to add these annotations to the analysis structure for input to further processing by other annotators 620.

In addition to the annotations, the CAS 610 of FIG. 7 may store the original document text, as well as related documents that may be produced by the annotators 620 (e.g., translations and/or summaries of the original document). Preferably, the CAS 610 includes extensions that facilitate the export of different aspects of the analysis structure (for example, a set of annotations) in an established format, such as XML.

More particularly, the CAS 610 is that portion of the TAE that defines and stores annotations of text. The CAS API is used both by the application and the annotators 620 to create and access annotations. The CAS API includes, preferably, at least three distinct interfaces. A Type system controls creation of new types and provides information about the relationship between types (inheritance) and types and features. One non-limiting example of type definitions is provided in TABLE 1. A Structure Access Interface handles the creation of new structures and the accessing and setting of values. A Structure Query Interface deals with the retrieval of existing structures.

The Type system provides a classification of entities known to the system, similar to a class hierarchy in object-oriented programming. Types correspond to classes, and features correspond to member variables. Preferably, the Type system interface provides the following functionality: add a new type by providing a name for the new type and specifying the place in the hierarchy where it should be attached; add a new feature by providing a name for the new feature and giving the type that the feature should be attached to, as well as the value type; and query existing types and features, and the relations among them, such as "which type(s) inherit from this type".

Preferably, the Type system provides a small number of built-in types. As was mentioned above, the basic types are int, float and string. In a Java implementation, these correspond to the Java int, float and string types, respectively. Arrays of annotations and basic data types are also supported. The built-in types have special API support in the Structure Access Interface.

The Structure Access Interface permits the creation of new structures, as well as accessing and setting the values of existing structures. Preferably, this provides for creating a new structure of a given type; getting and setting the value of a feature on a given structure; and accessing methods for built-in types. Feature definitions are provided for domains, each feature having a range.

In an alternative environment, modules of FIGS. 1, 2 can be represented as functional components in GATE (General Architecture for Text Engineering) (see: http://gate.ac.uk/releases/gate-2.0alpha2-build484/doc/userguide.html). Gate employs components which are reusable software chunks with well-defined interfaces that are conceptually separate from GATE itself. All component sets are user-extensible and together are called CREOLE—a Collection of REusable Objects for Language Engineering. The GATE framework is a backplane into which plug CREOLE components. The user gives the system a list of URLs to search when it starts up, and components at those locations are loaded by the system. In one embodiment, only their configuration data is loaded to begin with; the actual classes are loaded when the user requests the instantiation of a resource.). GATE components are one of three types of specialized Java Beans: 1) Resource: The top-level interface, which describes all components. What all components share in common is that they can be loaded at runtime, and that the set of components is extendable by clients. They have Features, which are represented externally to the system as "meta-data" in a format such as RDF, plain XML, or Java properties. Resources may all be Java beans in one embodiment. 2) ProcessingResource: Is a resource that is runnable, may be invoked remotely (via RMI), and lives in class files. In order to load a PR (Processing Resource) the system knows where to find the class or jar files (which will also include the metadata); 3) LanguageResource: Is a resource that consists of data, accessed via a Java abstraction layer. They live in relational databases; and, VisualResource: Is a visual Java bean, component of GUIs, including of the main GATE gui. Like PRs these components live in.class or .jar files.

In describing the GATE processing model any resource whose primary characteristics are algorithmic, such as parsers, generators and so on, is modelled as a Processing Resource. A PR is a Resource that implements the Java Runnable interface. The GATE Visualisation Model implements resources whose task is to display and edit other resources are modelled as Visual Resources. The Corpus Model in GATE is a Java Set whose members are documents. Both Corpora and Documents are types of Language Resources (LR) with all LRs having a Feature Map (a Java Map) associated with them that stored attribute/value information about the resource. FeatureMaps are also used to associate arbitrary information with ranges of documents (e.g. pieces of text) via an annotation model. Documents have a DocumentContent which is a text at present (future versions may add support for audiovisual content) and one or more AnnotationSets which are Java Sets.

As UIMA, GATE can be used as a basis for implementing natural language dialog systems and multimodal dialog systems having the disclosed question answering system as one of the main submodules. The references, incorporated herein by reference above (U.S. Pat. Nos. 6,829,603 and 6,983,252, and 7,136,909) enable one skilled in the art to build such an implementation.

Figure 5:
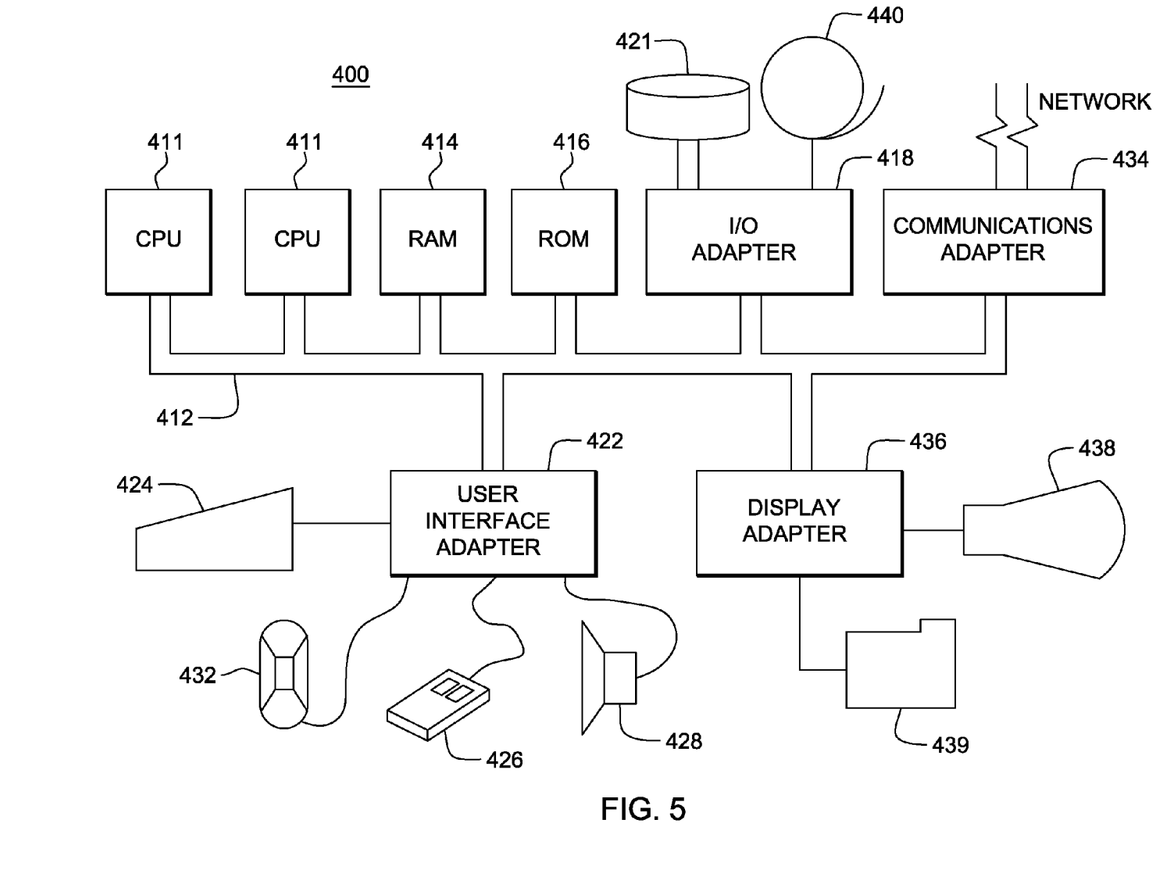
FIG. 5 illustrates an exemplary hardware configuration to run method steps described in FIG. 3 in one embodiment.

FIG. 5 illustrates an exemplary hardware configuration of a computing system 400 in which the present system and method may be employed. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A computer program product for automatically scoring candidate answers to questions in a question and answer system, the computer program product comprising a storage medium readable by a processing circuit and storing instructions run by the processing circuit for performing a method, the method comprising:
   receiving plural candidate answers associated with a query string, said plural candidate answers obtained from at least one document in a data corpus using query terms;
   identifying one or more entity structures embedded in said at least one document; and for each at least one document:
   extracting said one or more entity structures embedded in said at least one document, said embedded entity structures comprising user embedded tags or embedded links to other documents;
   determining a number of said entity structures having terms in said embedded tags or embedded links to other documents that match query terms in the received input query string;
   computing a score for each of said plural candidate answers in said document as a function of a count of said number of entity structures having terms in said embedded tags or said embedded links to other documents that match query terms in the query string;
   said score computing comprising: assigning an associated weight to a count of said matching query terms associated with each said score for each said plural candidate answer; and
   computing a final score by combining each weighted match count associated with each of the candidate answers.

2. The computer program product as in claim 1, wherein said method further comprises:
   accessing a table having entries, each entry including an identified document's corresponding identifier information, and a corresponding value of entity identifiers from the one or more entity structures embedded in that identified document, said determining a number of said entity structures comprises: traversing said table to identify said number of associated entity structures associated with a document.

3. The computer program product as in claim 1, wherein said determining a number of said entity structures having terms in said embedded tags or out-links that match query terms comprises:
   determining a similarity of a term in an embedded tag or said embedded link to another document and said query terms; and
   estimating a relevance of the candidate answer to the question based on the determined similarity.

4. The computer program product as in claim 3, wherein said determining a similarity comprises: applying a comparison function to generate a resulting comparison score, said candidate score comprising said comparison score.

5. A system for automatically scoring candidate answers to questions in a question and answer system comprising:
   a memory storage device;
   a processor device in communication with the memory device that performs a method comprising:
   receiving plural candidate answers associated with a query string, said plural candidate answers obtained from at least one document in a data corpus using query terms;
   identifying one or more entity structures embedded in said at least one document; and for each at least one document:
   extracting said one or more entity structures embedded in said at least one document, said embedded entity structures comprising user embedded tags or embedded links to other documents;
   determining a number of said entity structures having terms in said embedded tags or said embedded links to other documents that match query terms in the received input query string;
   computing a score for each of said plural candidate answers in said document as a function of a count of said number of entity structures having terms in said embedded tags or said embedded links to other documents that match query terms in the query string;
   said score computing comprising: assigning an associated weight to a count of said matching query terms associated with each said score for each said plural candidate answer; and
   computing a final score by combining each weighted match count associated with each of the candidate answers.

6. The system as in claim 5, wherein said processor further performs:
   accessing a table having entries, each entry including an identified document's corresponding identifier information, and a corresponding value of entity identifiers from the one or more entity structures embedded in that identified document, wherein said determining a number of said entity structures comprises: traversing said table to identify said number of associated entity structures associated with a document.

7. The system as in claim 5, wherein said determining a number of said entity structures having terms in said embedded tags or links that match query terms comprises:

determining a similarity of a term in an embedded tag or said embedded link to another document and said query terms; and estimating a relevance of the candidate answer to the question based on the determined similarity.

8. The system as in claim 7, wherein said determining a similarity comprises: applying a comparison function to generate a resulting comparison score, said candidate score comprising said comparison score.

9. The computer program product of claim 1, wherein each said query string associated with an untyped question.

10. The system of claim 5, wherein each said query string associated with an untyped question.

11. The computer program product of claim 1, wherein said assigning comprises: implementing a machine learning algorithm for associating said weights with a match count.

12. The system of claim 5, wherein said assigning comprises: implementing a machine learning algorithm for associating said weights with a match count.

13. The computer program product of claim 4, wherein said comparison function comprises one or more of: a string equal function, an edit distance or a synonym matching.

14. The system of claim 8, wherein said comparison function comprises one or more of: a string equal function, an edit distance or a synonym matching.

15. The computer program product of claim 1, further comprising:
   receiving a specification of a type of entity structure to look for in a document; and
   implementing search engine and retrieval functions to specifically search the document for said entity structure type.

16. The system of claim 1, wherein the method further comprises:
   receiving a specification of a type of entity structure to look for in a document; and
   implementing search engine and retrieval functions to specifically search the document for said entity structure type.

* * * * *